May 23, 1972  A. B. GOBBY  3,664,683
BASKET ATTACHMENT FOR TRICYCLE
Filed Nov. 28, 1969  3 Sheets-Sheet 1

INVENTOR.
ALAN B. GOBBY
BY
ATTORNEY

May 23, 1972        A. B. GOBBY        3,664,683
BASKET ATTACHMENT FOR TRICYCLE
Filed Nov. 28, 1969        3 Sheets-Sheet 2
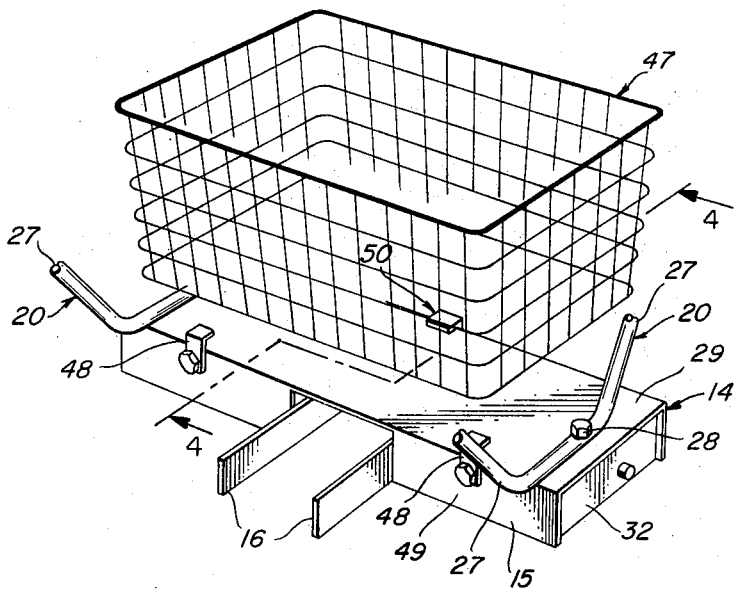
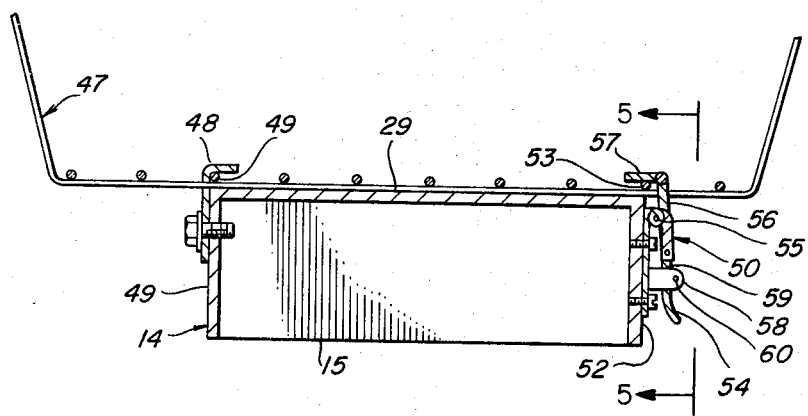
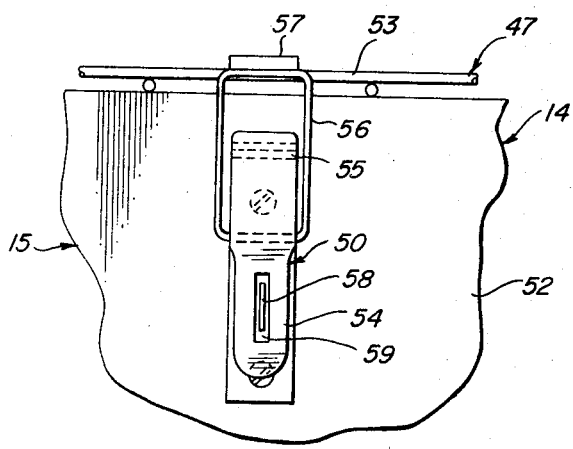
INVENTOR.
ALAN B. GOBBY
BY
ATTORNEY May 23, 1972   A. B. GOBBY   3,664,683
BASKET ATTACHMENT FOR TRICYCLE
Filed Nov. 28, 1969   3 Sheets-Sheet 3
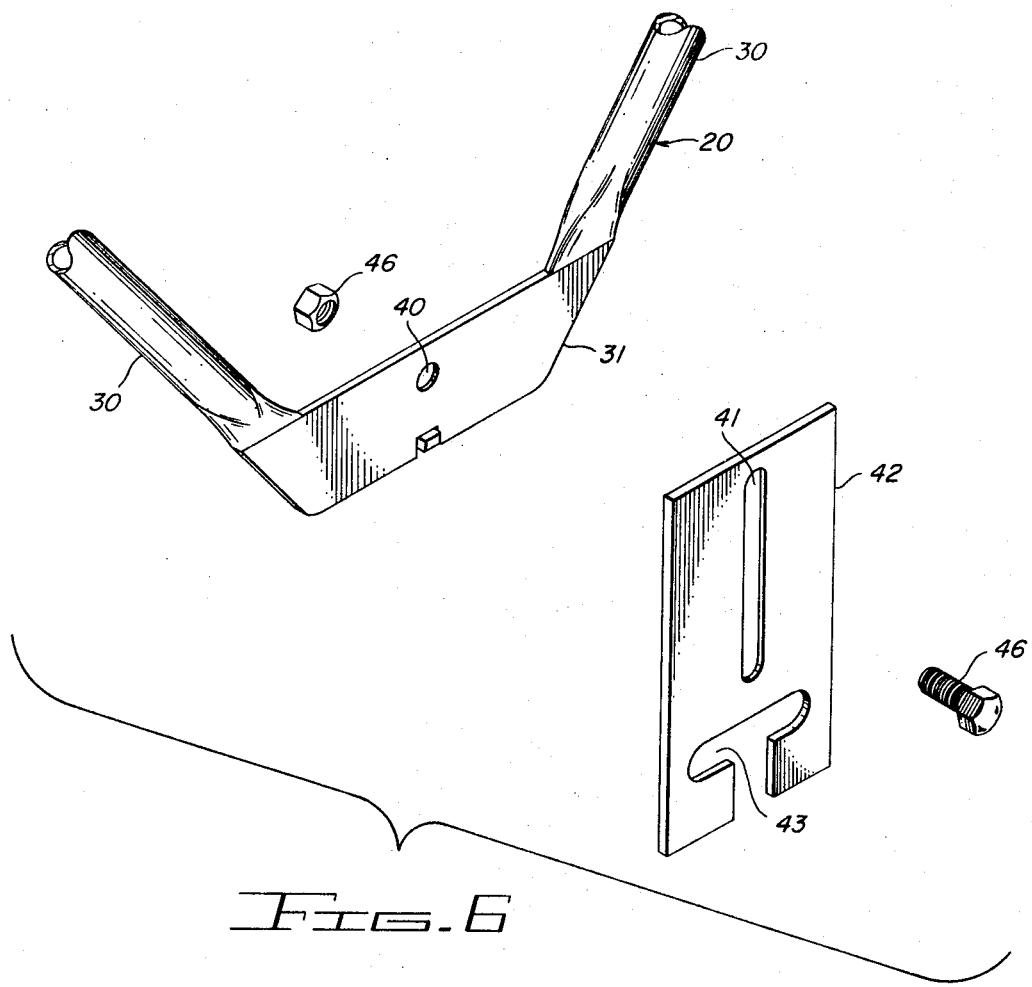
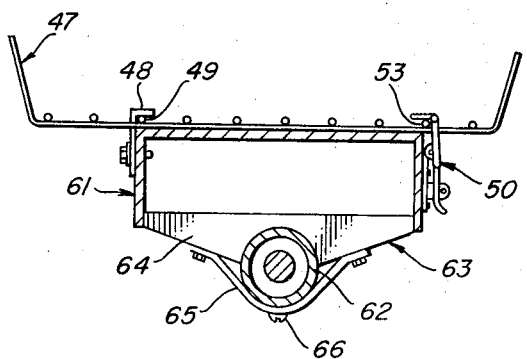
INVENTOR.
ALAN B. GOBBY
BY
ATTORNEY 3,664,683
BASKET ATTACHMENT FOR TRICYCLE
Alan B. Gobby, Glendale, Ariz., assignor to
Gobby Mfg., Inc., Glendale, Ariz.
Filed Nov. 28, 1969, Ser. No. 880,739
Int. Cl. B21j 9/00
U.S. Cl. 280—202   1 Claim

ABSTRACT OF THE DISCLOSURE

A basket attachment mechanism for a tricycle having the usual steerable front wheel assembly, pedal-sprocket mechanism, and a rear axle assembly with contains the mechanism that transmits the driving force from the sprocket to at least one of the rear wheels which are journaled on opposite ends of the axle assembly. A demountable basket assembly is attached between the rear wheels and above the axle assembly.

BACKGROUND OF THE INVENTION

This invention relates to the art of tricycle construction.

More particularly, the invention concerns the mounting of a basket assembly to the above mentioned tricycle.

In a further aspect, the invention concerns a basket which can be removed from the tricycle to provide a shopping basket or for ease of loading and unloading.

In a still further aspect, the invention concerns a mechanism for demountably attaching the basket assembly to the tricycle to provide ease of mounting and removal, while still maintaining a thief-proof structure.

The provision of a basket on tricycles is a highly desirable feature that has long been recognized in the art, as many vehicles of this type are used in retirement communities for shopping trips and the like.

Basket assemblies of conventionally constructed tricycles are attached to a frame located behind the seat and over the rear axle. The methods of attaching the basket to the frame vary from welding to clamps which are bolted to the frame. At best these prior art devices cannot be considered as "easily removable" due to necessity of tools to effect the removal.

It would be highly advantageous, therefore, to provide a demountable basket assembly to lead greater utility to the basket, and provide a greater degree of convenience for the user.

SUMMARY OF THE INVENTION

It is a primary object of the present invention to provide a basket for a tricycle which is simple and economical to manufacture.

Another object of the present invention is to provide a demountable basket assembly for the above described vehicle which incorporates a thief-proof mechanism.

My invention may be adapted to different types of rear axle assemblies with a minimum amount of changes to the hardware. Briefly, to accomplish the desired objectives of the present invention, I provide a platform suitably attached to the rear axle of a conventional tricycle so as to provide a substantially horizontal surface above the axle. In the type of rear axle construction shown in the accompanying drawings, it will be seen that the platform is already provided as an integral part of the axle assembly. To the forwardly extending portions of the platform, I attach at least one fixed clamp member by which a front lower wire member of the basket is slidably mounted. To the rearwardly extending portion of the platform I attach a hasp or latch mechanism which may be positioned to engage a rear lower wire member of the basket. The hasp member may be provided with locking means to prevent it from being disengaged from the basket.

BRIEF DESCRIPTION OF THE DRAWINGS

Further and more specific objects and advantages of the present invention will become readily apparent to those skilled in the art from the following detailed description thereof taken in conjunction with the drawings, in which

FIG. 3 is a perspective view of a fragmentary portion of the rear axle assembly having the basket exploded therefrom.

FIG. 4 is a sectional view taken on the line 4—4 of FIG. 3.

FIG. 5 is a sectional view taken on the line 5—5 of FIG. 4.

FIG. 6 is a fragmentary exploded view illustrating an adjustable feature of a support frame.

FIG. 7 illustrates a modification of the present invention in which the demountable basket assembly is mounted on another type of rear axle assembly.

DESCRIPTION OF THE PREFERRED EMBODIMENT

Figure 1:
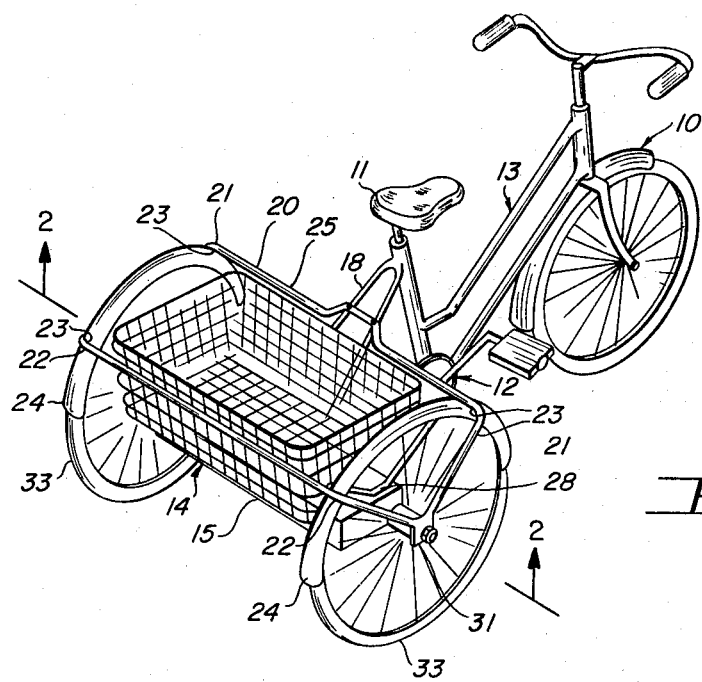
FIG. 1 is a perspective view of a tricycle incorporating the features of this invention.
Figure 2:
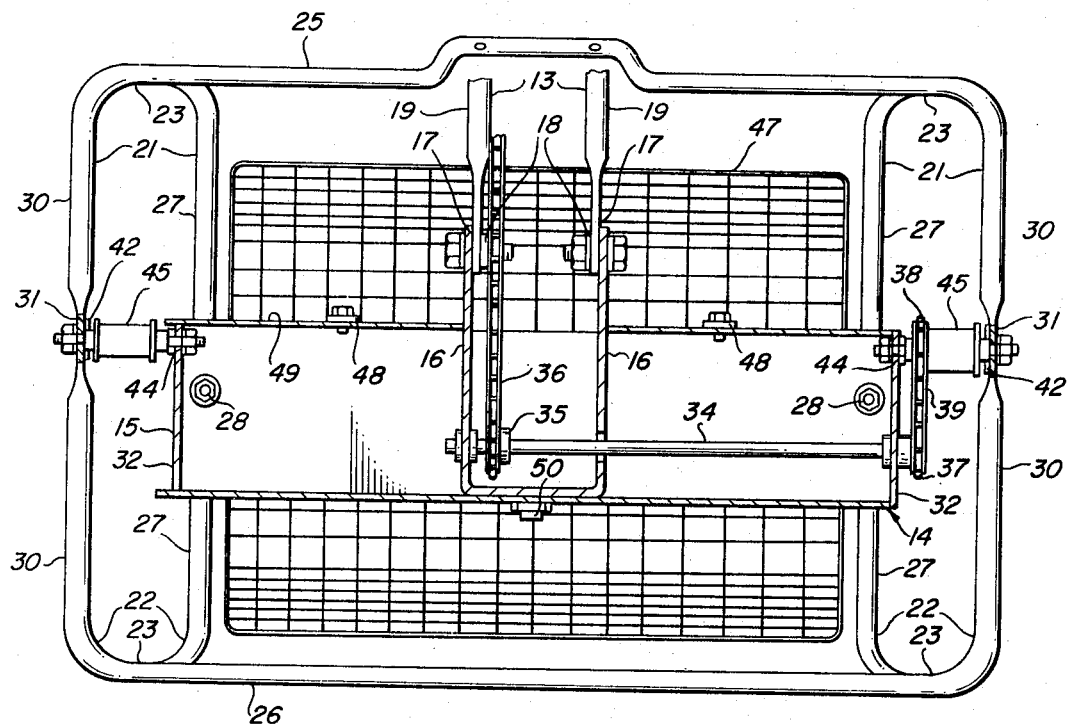
FIG. 2 is a sectional view of the rear axle and basket assembly taken on the line 2—2 of FIG. 1.

Turning now to the drawings, in which the same reference numerals indicate corresponding elements throughout the various figures, FIG. 1 illustrates a tricycle having the normal elements of a steerable front wheel assembly 10, the seat assembly 11, sprocket-chain drive assembly 12, and a conventional two-wheel bicycle frame 13. The rear axle assembly means indicated generally at 14, illustrates a method of converting a conventional two wheel bicycle to a tricycle. The rear axle 14 comprises a rectangular box-shaped platform means 15 which is provided with suitable lugs 16 which are positioned for attachment to the frame 13 at the junction points 17 of rearwardly extending forks 18 and 19. Attachment of the lugs 16 to forks 18 and 19 positions the platform 15 in transverse relationship with the frame 13. A support frame 20 is provided with a pair of front bifurcated members 21 and a pair of rear bifurcated members 22 adapted at their upper ends 23 to carry rear fenders 24. Front bifurcated members 21 are supported by a tie rod 25 which is adapted intermediate its ends to secure to fork 18 of frame 13. The rear bifurcated members 22 are supported by tie rod 26. The innermost tines 27 of bifurcated members 21 and 22 convergingly depend and are secured by bolts 28 to the top surface 29 of platform 15. The outermost tines 30 of bifurcated members convergingly depend and are appropriately secured at their lower ends to plates 31. The plates 31 and end panels 32 of platform 15 are provided with means for mounting the rear wheels 33 therebetween as will hereinafter be described in detail.

Suitably journaled within platform means 15 is a drive shaft 34 having a drive sprocket 35 connected to be driven by the usual bicycle chain 36. Rotary motion is transmitted through the drive shaft 34 to outer sprocket 37 which is positioned to drive wheel sprocket 38 by means of a chain 39.

FIG. 6 illustrates one of the plates 31, to which the lower ends of outermost tines 30 are secured such as by welding. Plates 31 are provided with a hole 40 which aligns with slot 41 of adjusting plates 42. Adjusting plates 42 are provided with axle slots 43 which align with similar slots 44 in end panels 32 of platform means 15. Slots 43 and 44 adjustably receive the usual axles 45 of rear wheels 33. Plates 31 abut adjusting plates 42 and are secured thereto by bolt-nut assembly 46.

The basket 47, of conventional construction, is removably mounted on platform means 15 by L-shaped clamps 48 fixed to the forward panel 49 of platform 15. Clamps 48 are positioned so that a forward wire member 49 of the basket 47 may be slidably positioned therein. A hasp 50 is mounted on the rear panel 52 of platform 15, to move into engagement with a rear wire 53 of basket 47. The hasp 50 is of normal construction having thumb latch 54, pivot pin 55, and retainer latch 56 with a wire retaining plate 57 suitably attached thereto. Locking of the basket 47 is accomplished by a normal lock plate 58 positioned to protrude through slot 59 of thumb latch 54. The lock plate 58 is provided with a hole 60 in which a conventional lock may be positioned.

A modification of the present invention is illustrated in FIG. 7 and shows a platform means 61 designed to be mounted to a rear axle housing 62 of tubular construction. The platform 61 is provided with the same clamps 48 and hasp 50 as is platform 15, and is additionally provided with clamp means 63. Clamp means 63 comprises at least one platform support plate 64, having a depending brace 65 suitably keyed with screw 66 to axle 62 to prevent rotation of platform 61 relative to axle 62.

Various changes in the device herein chosen for purposes of illustration in the drawing will readily occur to persons skilled in the art having regard for the disclosure hereof. To the extent that such modifications and variations do not depart from the spirit of the invention, they are intended to be included within the scope thereof which is not limited to the device or method specifically illustrated but rather only by a fair interpretation of the following claim.

Having fully described the invention in such a manner to enable those skilled in the art to understand and practice the same I claim:

1. A tricycle comprising:
   a frame having a steerable front wheel assembly mounted at one end, rearward extending spaced forks at the other end, and a sprocket chain driven assembly mounted between the ends of the frame,
   an axle assembly attached to the free ends of said forks, said axle assembly comprisng an open sided box having its longitudinal axis extending laterally of said forks with the open side of said box facing the ground,
   said open sided box having an apertured substantially vertically arranged front face and a substantially vertically arranged back face, and a U-shaped member the legs of which are attached one to the end of each of said forks to extend through said aperture in said front face of said box with the closed end of said U-shaped member being fastened to the inside surface of said back face of said box,
   a pair of wheel axles coaxially arranged and rotatably mounted one on each end of said box,
   a drive axle rotatably mounted on said U-shaped member in said box parallel to the longitudinal axis of the box and extending to one end of the box,
   a drive sprocket mounted on said drive axle adjacent the free end of said forks and a driven sprocket mounted on said drive axle adjacent said one end of said box, said drive sprocket being driven by a regular bicycle chain inter-connecting said drive sprocket with said sprocket chain driven assembly, said driven sprocket being connected to one of said wheel axles for rotation thereof.

References Cited
UNITED STATES PATENTS

| | | | |
|---|---|---|---|
| 1,168,995 | 1/1916 | Barnes | 280—202 |
| 1,303,854 | 5/1919 | Clark | 214—515 |
| 1,818,658 | 8/1931 | Thompson | 280—202 |
| 3,301,448 | 1/1967 | Inoue | 224—32 |
| 2,842,375 | 7/1958 | Nightingale | 280—291 X |
| 3,229,988 | 1/1966 | Mansperger | 280—7.15 |
| 3,368,823 | 5/1966 | Templeton | 280—7.15 |
| 3,517,867 | 6/1970 | Fritz et al. | 224—32 R |

FOREIGN PATENTS

| | | | |
|---|---|---|---|
| 338,755 | 3/1936 | Italy | 280—202 |

ROBERT G. SHERIDAN, Primary Examiner

U.S. Cl. X.R.

224—32 R; 280—7.1